United States Patent [19]

Walker et al.

[11] Patent Number: 4,541,768
[45] Date of Patent: Sep. 17, 1985

[54] CONTAINER TRAILER

[75] Inventors: William B. Walker, Orlando, Fla.;
Paul D. Justus, Gruver, Iowa;
Michael K. Bloomfield, Orlando, Fla.

[73] Assignee: FMC Corporation, Chicago, Ill.

[21] Appl. No.: 541,743

[22] Filed: Oct. 13, 1983

[51] Int. Cl.$^4$ .............................. B60P 1/52
[52] U.S. Cl. .............. 414/535; 193/35 MD;
193/35 SS; 198/412; 198/414; 244/137 R;
414/536
[58] Field of Search .............. 414/518, 529, 531–533,
414/535, 536; 198/782, 787, 394, 412, 361, 413,
414, 773, 775, 776; 193/35 MD, 35 SS; 244/137
R

[56] References Cited

U.S. PATENT DOCUMENTS

| | | | |
|---|---|---|---|
| 1,931,628 | 10/1933 | Von Reis | 198/457 X |
| 3,679,075 | 7/1972 | Guyaux et al. | 414/533 |
| 3,684,108 | 8/1972 | Olson | 414/531 |
| 4,456,116 | 6/1984 | Jarman | 198/414 |

Primary Examiner—Robert J. Spar
Assistant Examiner—Lyle Kim
Attorney, Agent, or Firm—A. J. Moore; H. M. Stanley;
R. B. Megley

[57] ABSTRACT

A "no-lift" container trailer is disclosed having a vertically movable roller tray with parallel rollers thereon which when tangent to the roll plane, and solely support a container thereon allow the container to be moved onto or off the trailer. A vertically movable caster tray of the trailer has fixed caster wheels thereon with their axes of rotation intersecting a vertical axis near the center of the trailer. When the wheels provide sole support for the container at the roll plane the container may be rotated about the vertical axis to any desired position. Manually operated cams are provided to sequentially move only the rollers tangent to the roll plane for supporting the container only on the rollers to move both the rollers and wheels tangent to the roll plane, and to move the rollers below the roll plane for supporting the container only on the wheels thus transferring the containers between the rollers and the wheel at the roll plane without lifting the container. Container stops, guide rails and latches are responsive to movement of the wheels tangent to the roll plane to move the stop guide rails and latches to inoperative positions.

32 Claims, 24 Drawing Figures

FIG_14

FIG_15

CONTAINER TRAILER

BACKGROUND OF THE INVENTION

1. Field of the Invention

The present invention relates to container trailers for carrying containers between a terminal and an aircraft loader or the like, and more particularly relates to such a trailer capable of supporting a container at a common roll plane for linear movement when in one mode and for rotational movement of the container about a vertical axis when in a second mode without lifting the container between modes.

2. Description of the Prior Art

Container trailers are known which support containers on caster wheels mounted on a turntable thereby making it possible to pivot the container into different positions by pivoting the turntable about a vertical axis. Assignee's U.S. Pat. No. 3,679,075 which issued to Guyaux et al on July 25, 1972 discloses such a trailer, and is incorporated by reference herein for its showing of the type of wheel tie-bar and lever linkages that are used for controlling the steering movement of the wheels of the trailer of the present invention.

SUMMARY OF THE INVENTION

In accordance with the present invention a container trailer is disclosed which includes rollers on a roller supporting tray and rubber covered caster wheels on a non-pivotable caster wheel supporting tray, both the roller and the wheels may be simultaneously positioned tangent to a roll plane for simultaneously supporting a container. Each tray may thereafter be lowered relative to the other tray for providing sole support of the container in the roll plane. When the caster tray is lowered, the container may be moved along a linear path onto or off of the trailer while being supported solely by the rollers and after at least one container stop has been lowered. When the roller tray is lowered, the container is supported only by the caster wheels, each of which has its horizontal axis of rotation intersecting a vertical central pivot axis about which the container may be pivoted in order to change the orientation of the container on the trailer.

In response to lowering the caster tray, a pair of end guides are lowered and container clamps are released thereby permitting rotation of the container on the caster wheels. When a container is being loaded onto the trailer, the adjacent container stop is cammed downwardly by the container; and when unloading the container from the trailer, the operator manually pushes the container off the opposite side of the trailer while actuating a lever to lower the container stop on said opposite side but retaining the stop on the operator's side in container blocking position.

The container trailer of the present invention may therefore be called a "no-lift" trailer which fulfills a need of the airline industry for an easily operated trailer which can be used to transfer a generally rectangular container between the trailer and an aircraft loader either sideways or endwise. Thus, the container can be rotated to any desired position in a 360° arc while supported by rubber tired wheels, and can then be supported solely by the rollers in the roll plane for transfer to the loader.

DESCRIPTION OF THE PREFERRED EMBODIMENT

Figure 1:
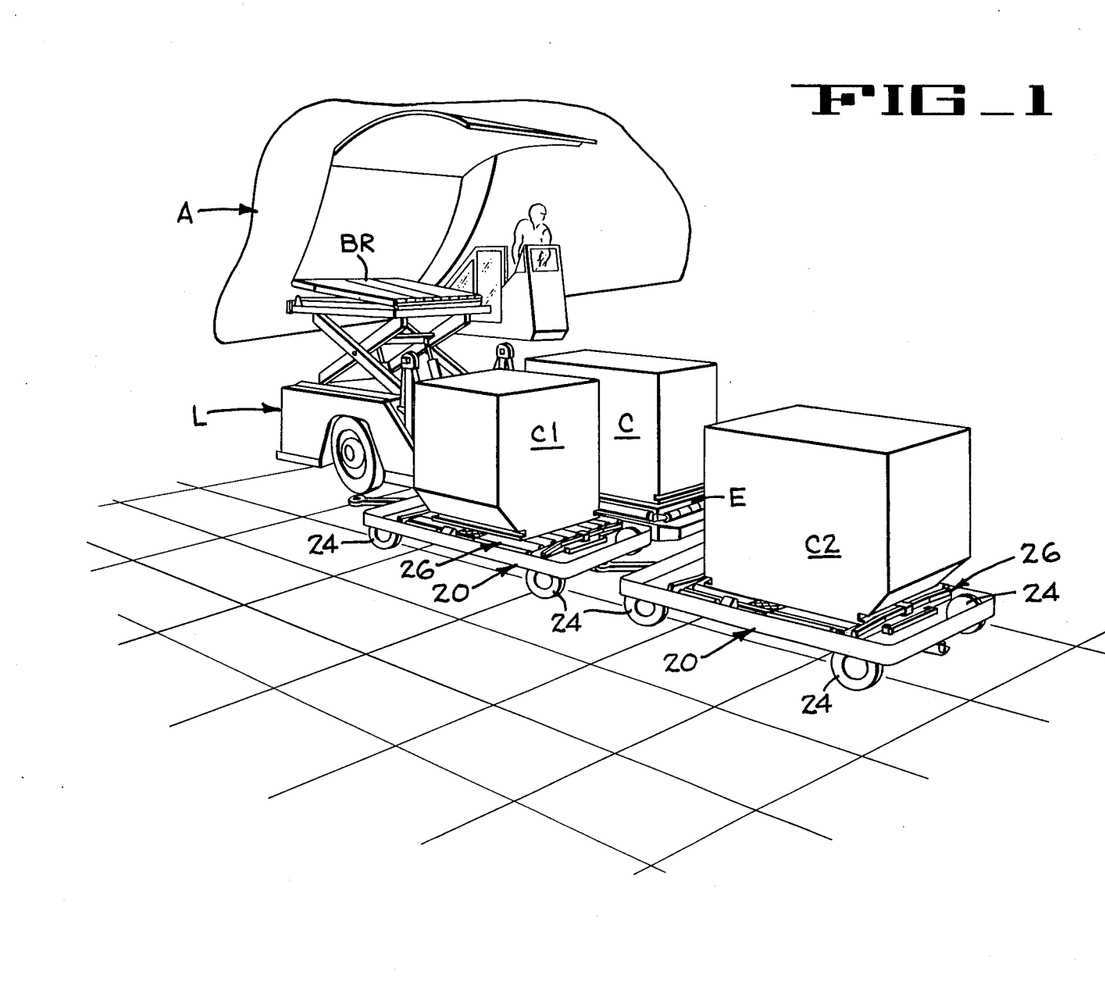
FIG. 1 is a diagrammatic perspective illustrating two container trailers adjacent an aircraft loader and an aircraft being loaded or unloaded.

The environment in which the container trailer 20 of the present invention is used is illustrated in FIG. 1. Two trailers 20 are shown positioned adjacent one side of an aircraft loader L which is connected to a cargo opening of an aircraft A. One container C is positioned on the elevator E of the loader L and will be lifted to the height of the aircraft's cargo floor and be transferred over a bridge BR into the aircraft A. After the empty elevator E is lowered to the illustrated position, the container C1 will be rotated 90° about a vertical axis in a clockwise direction while supported on the trailer 20 and will then be manually pushed onto the elevator E. The second trailer 20 will then be moved into loading position adjacent to the elevator E while the container C1 is being transferred into the aircraft and the elevator has been returned to the lowered position. The container C2 need not be rotated if it is to be loaded on the illustrated side of the aircraft A. It will be understood, however, that the container C may be rotated to any desired position while on the trailer before being transferred to the elevator E or to a loading dock (not shown).

Two embodiments of the container trailer of the present invention will be disclosed.

FIRST EMBODIMENT

Figure 2:
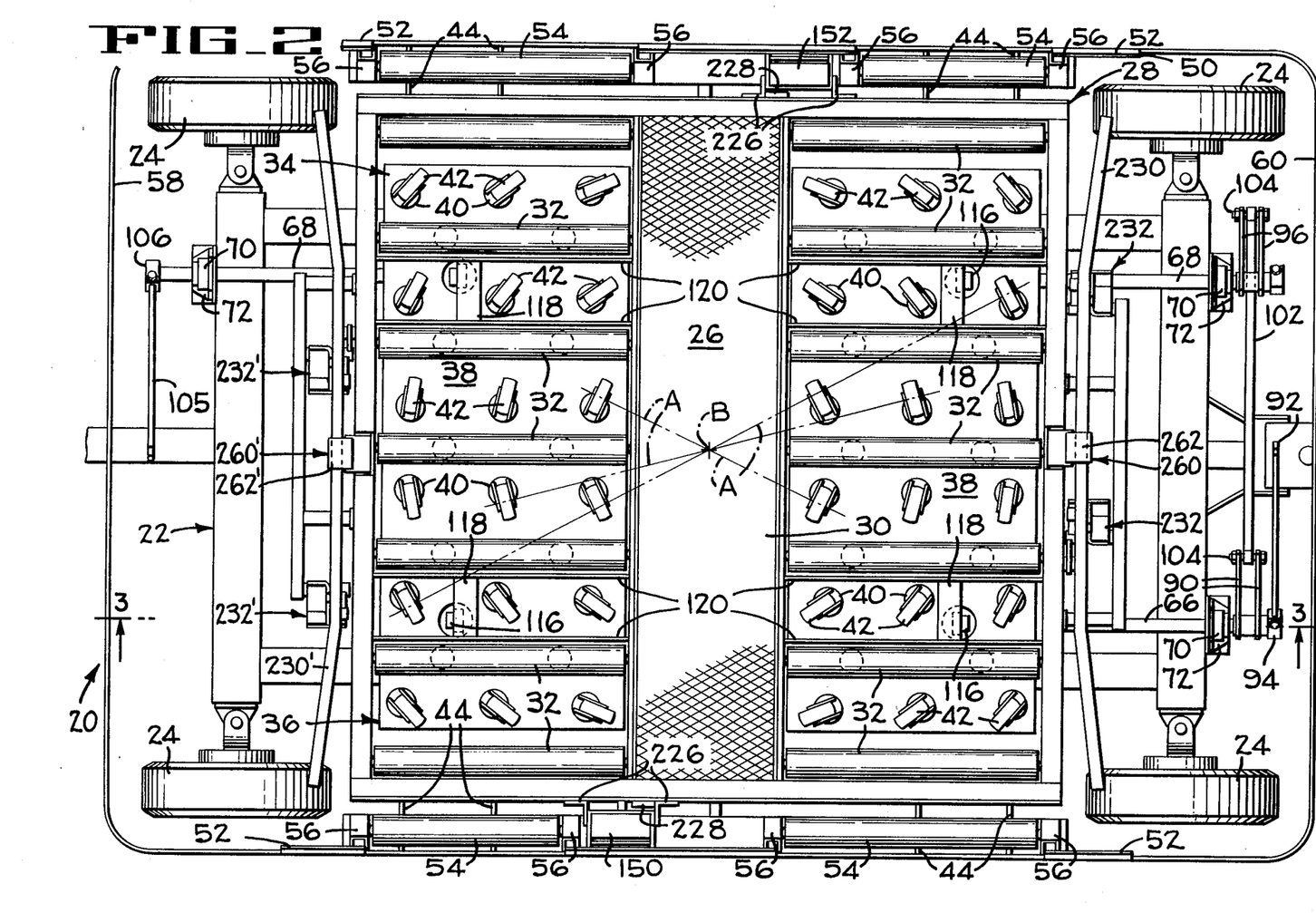
FIG. 2 is a plan of the container trailer of the present invention, the tow bar being omitted.

A container trailer 20 (FIGS. 2-4), in general, comprises a main frame or chassis 22 supported by four steerable wheels 24, with the wheel steering mechanism being omitted for simplicity. A roller tray 26 includes a generally rectangular frame 28 with a transversely extending catwalk 30 intermediate its ends. The frame 28 and catwalk side members rotatably support a plurality of rollers 32 which are tangent to and define a roll plane RP (FIG. 3) when in their elevated positions. A caster tray 34 is supported by a generally rectangular caster frame 36 which includes a plurality (two being illustrated) of inverted channel shaped trays 38 (FIG. 3) upon which a plurality of caster wheel frames 40 are rigidly secured with each caster wheel frame being locked in a position wherein the rotatable axes A (FIG. 2) of each caster wheel 42 intersects a common vertical axis B about which the container C may be rotated. As best shown in FIGS. 2, 5, 5A and 5, the caster wheels are positioned between or adjacent to rollers 32 so that they will not contact the rollers.

The wheel steering mechanism is the same as that disclosed in assignee's previously referred to Guyaux et al U.S. Pat. No. 3,679,075, and reference may be had to that patent if a description of the tow bar controlled steering mechanism is desired.

It will be understood that the term "container" includes any type of load having a substantially flat bottom which will permit movement of the load relative to the rollers and caster wheels. Thus, loads on flat bottomed pallets or the like are included in the term "container".

The term "caster wheels" as used herein includes any type of narrow roller or wheel which has its of rotation fixed in position to intersect the vertical axes B of rotation of the containers. The periphery of all wheels are preferably covered with rubber or a non-slip plastic to allow rotation of the container but to prevent sliding of the container on the wheels.

More particularly, the chassis or main frame 22 includes four angle members 44 (FIGS. 4-6) which extend upwardly and outwardly from box beams 46. A smaller box beam 48 and a generally channel shaped walls or guards 50 with inwardly flared flanges 52 are welded to the upper end of the angle member 44. The upper flanges 52 are cut away to receive four lead-in rollers 54 which are disposed slightly below the roll plane RP and are journalled on brackets 56 welded to the small box beam 48 as best shown in FIGS. 2 and 5. Generally U-shaped front and rear guards 58 and 60 (FIG. 2) are welded to the side walls or guards 50 to enclose the wheels 24 and other structure within the guards 50, 58 and 60.

In order to prevent the roller tray 26 from bouncing out of the trailer 20 when moving over rough surfaces, four threaded hold down rods 61 (FIGS. 5, 5A 6 and 7) are welded to and project downwardly from the roller tray 26. The rods 61 project through holes in angle brackets 62 that are welded to members 44 of the chassis or main frame 22. A locknut and washer 63 are secured to each rod in position to provide a slight clearance between the washer and the bracket 62 when the roller tray 26 is in its uppermost position as illustrated in FIGS. 5, 5A and 7 with the nuts 63 and washers preventing the roller tray 26 from bouncing out of the trailer. When the roller tray is moved downwardly, the hold down rods 61, nuts 63 and washers each move downwardly to the position illustrated in FIGS. 6 and 9 with the nuts and washers spaced below the holes in the brackets 62.

Figure 3:
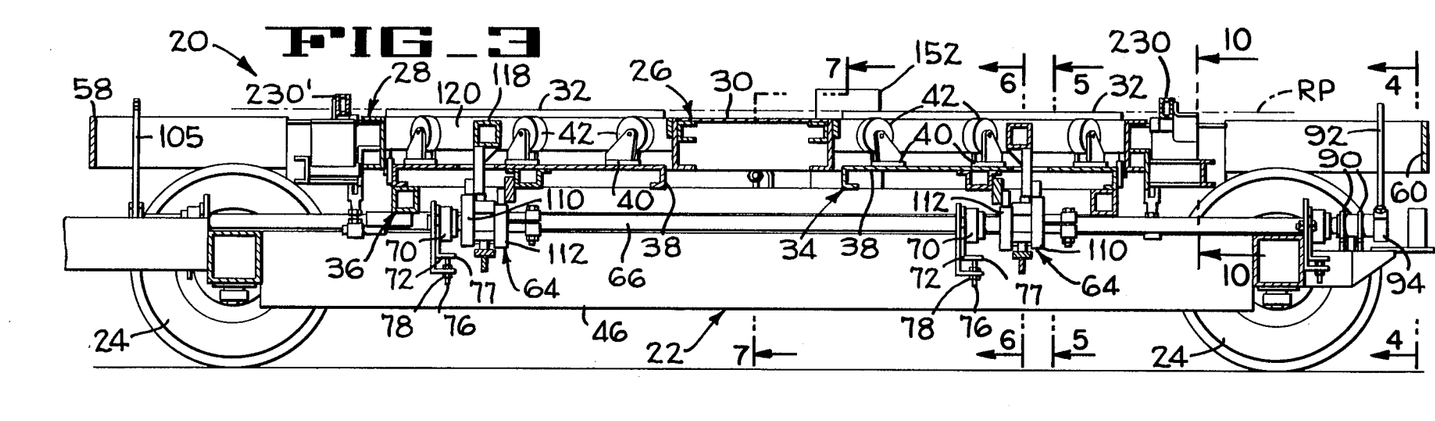
FIG. 3 is a longitudinal section taken along lines 3—3 of FIG. 2 illustrating the roller tray in its upper position and the caster tray in its lower position.

The roller tray 26 and the caster tray 34 are supported by four pairs of cam assemblies 64 (FIGS. 3, 5 and 6) mounted on longitudinally extending cam shafts 66,68. The cam shafts 66,68 extend substantially the full length of the portion of the trailer 20 within the guards 58,60 and are journaled in a plurality of bearings 70 mounted in vertically adjustable brackets 72 which are secured to box beams 46 of the main frame 22 as best shown in FIGS. 3 and 5. The bearing brackets 72 are of conventional design and are adjusted by nuts secured to a bolt 76 welded to an inner bracket portion 77 and thereafter locked in place by nuts 78 (FIG. 3).

Figure 4:
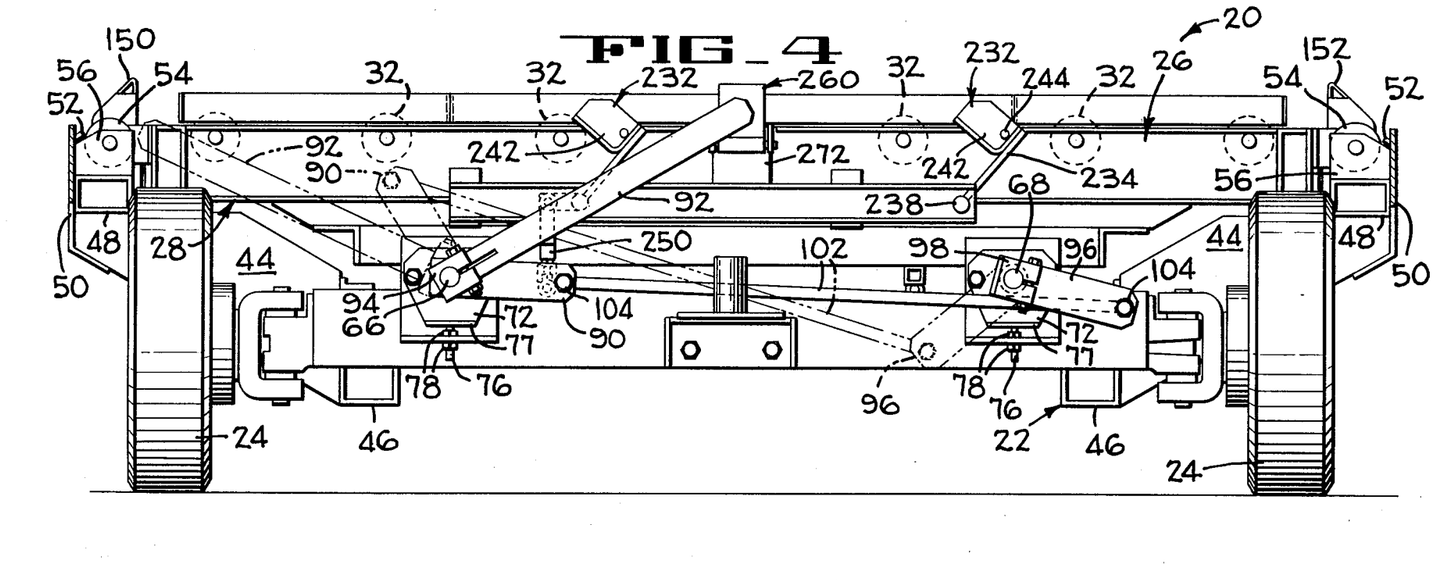
FIG. 4 is a transverse operational section taken along lines 4—4 of FIG. 3 looking toward the front of the trailer, the caster wheels being omitted for simplicity.
Figure 5:
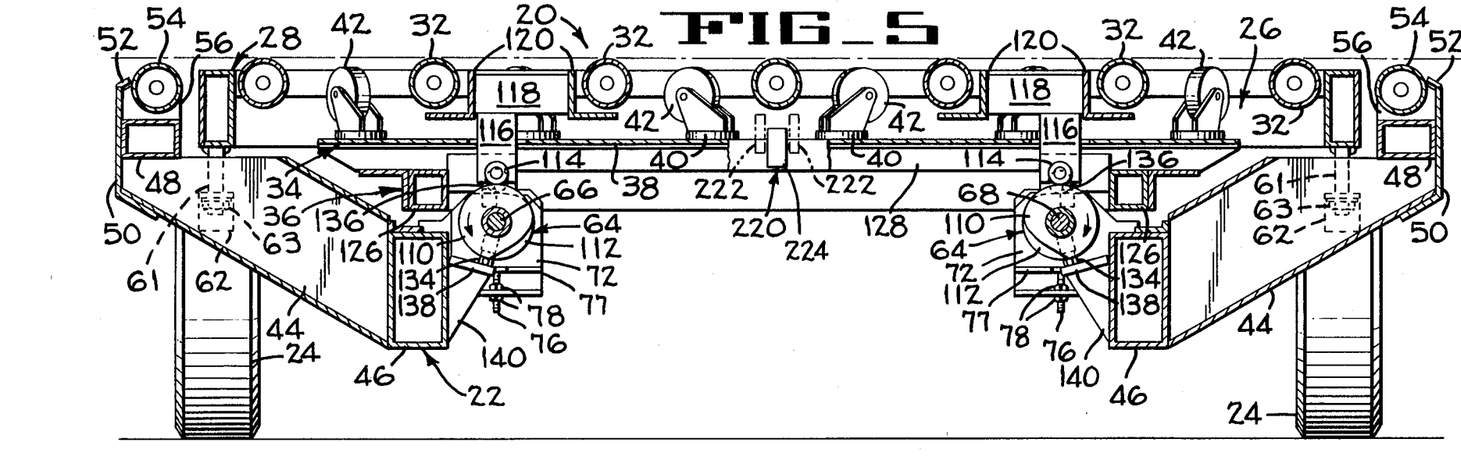
FIG. 5 is a transverse operational section taken along lines 5—5 of FIG. 3 illustrating two of the roller tray cams in full lines and a portion of the caster tray cam in dotted lines, the container stops being removed for simplicity.
Figure 5A:
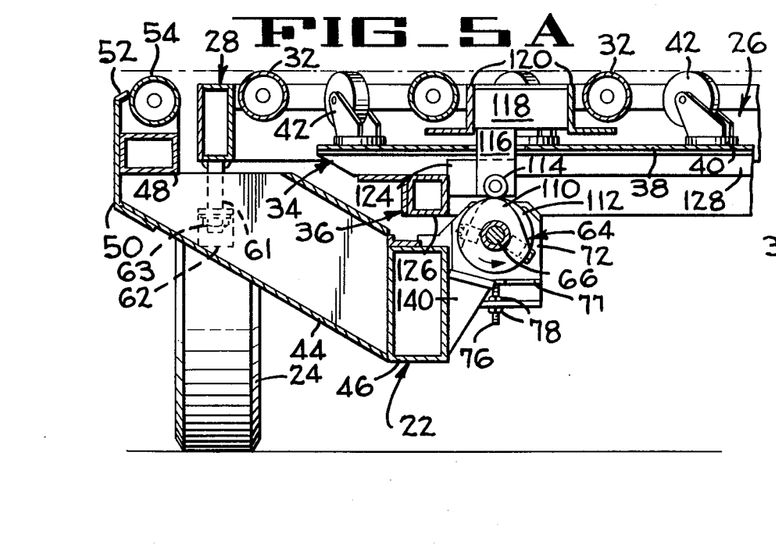
FIG. 5A is a transverse operational section taken along lines 5—5 of FIG. 3 illustrating the left half of the trailer with the cams shifted to a position wherein both the roller tray and the caster tray are in their raised positions and with the rollers and casters jointly supporting the container at the roll plane, the container stops being omitted for simplicity.

As best shown in FIGS. 2 and 4, a pair of spaced lever arms 90 and a handle 92 are secured to the cam shaft 66 by a bolt and split block 94; and a similar pair of lever arms 96 are secured to the cam shaft 68 by a bolt and split block 98. A connecting rod 102 is pivotally connected to the free ends of the spaced pairs of lever arms 90,96 by bolts 104. It will be noted in FIG. 3 that the handle 92 and lever arms 90 are parallel and are pivoted in a counterclockwise direction within the range of about 115° to 150° (preferably about 135° in the first embodiment); and that the lever arms 96 are oriented so that the connecting rod 102 extends below the cam shaft 68 and pivots in a clockwise direction when the handle 92 is pivoted from the solid line position to the dotted line position.

As will be made apparent below, when the handle is in its solid line position the upper surface of the rollers 32 are tangent to the roll plane RP and the caster wheels 42 are below the roll plane. When the operator pivots the handle from the solid line position to the dotted line position, the rollers 32 will remain tangent to the roll plane RP until after the upper surfaces of the caster wheels 42 are also tangent to the roll plane RP as shown in FIG. 5A. Continued movement of the handle 92 in the counterclockwise direction will thereafter lower the roller tray 26 and its rollers 32 out of the roll plane RP so that the container is supported solely on the caster wheels 42 and can be pivoted about vertical axis B (FIG. 2). Thus, the operator does not lift the container by movement of the handle but merely moves the caster wheels 42 into container supporting position.

As best shown in FIG. 2, a handle 105 is secured to the forward end of the cam shaft 68 by a bolt and split block 106. Thus, the operator can transfer the load between the rollers 32 and the caster wheels 42 from either end of the trailer 20 without lifting the container.

For performing the above mentioned functions, each of the four cam assemblies 64 (FIGS. 5, 5A and 6) includes a roller tray cam 110 and a caster tray cam 112. Each roller tray cam 110 engages a cam follower 114 journaled on a vertical leg 116 that is rigidly secured to a short box beam 118 welded between a pair of longitudinally extending angle bars 120 (FIG. 5) of the roller tray frame 28. Each caster tray cam 112 engages a cam follower 122 (FIGS. 3 and 6) journaled on a horizontal arm 124 that is welded to a longitudinal box member 126 (FIGS. 5, 5A and 6) and a transverse channel member 128 (FIG. 6) of the caster tray frame 36.

Figure 6:
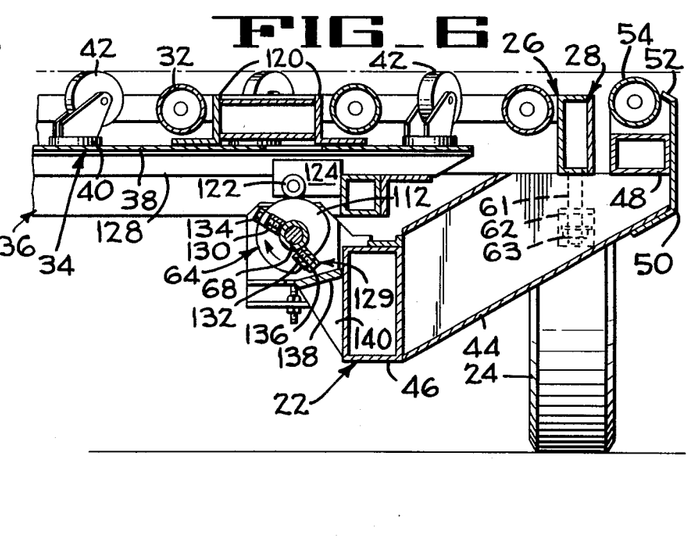
FIG. 6 is a section taken along lines 6—6 of FIG. 3 illustrating the right half of the trailer with the roller tray lowered and the caster tray raised with the container solely supported by the caster wheels in the roll plane, the container stops being omitted for clarity.
Figures 7, 8, 9:
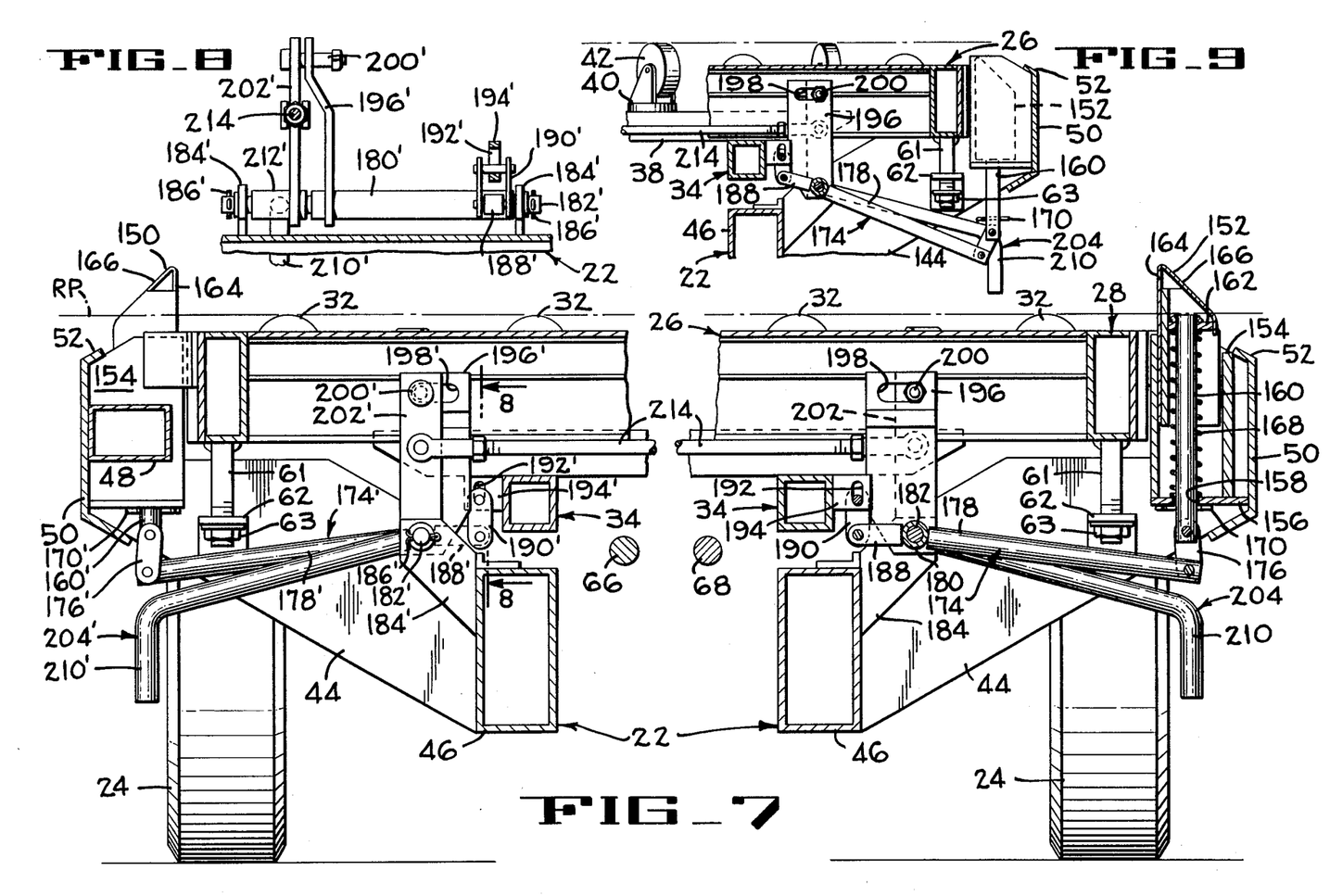
FIG. 7 is a transverse section taken substantially along lines 7—7 of FIG. 3 illustrating the container stops in raised position and the linkage for operating the same, the central portion of the trailer being cut away and the wheels being omitted for simplicity.
FIG. 8 is a section taken along lines 8—8 of FIG. 7 illustrating a portion of the stop linkage.
FIG. 9 is a section of the right hand portion of the trailer taken at a smaller scale and illustrating the caster tray up and the roller tray down with the stop in its retracted position below the roller plane.

The contour of each roller tray cam 110 and caster tray cam 112 are best illustrated in FIGS. 5, 5A and 6 in different operative positions.

In FIG. 5, the roller tray 26 is raised and the caster tray 34 is in its lower position. When in this position the handle 92 (FIG. 4) is in its substantially horizontal position shown in full lines in FIG. 4; each roller frame cam follower 114 is positioned on a circular portion of the roller tray cam 110, and the caster tray cam follower 122 is positioned on a flat portion of the caster tray cam 112.

In FIG. 5A, both the roller tray 26 and the caster tray 34 are raised with the upper surfaces of the rollers 32 and caster wheels 42 in position to support a container at the roll plane RP. At this time the cam has been rotated about 80° from the FIG. 5 position in response to the operator pulling the handle 92 or 104 upwardly.

In FIG. 6, the roller tray 26 is down and the caster tray 34 is up. At this time, in response to additional movement of the handle 92 or 104 by the operator, the caster tray cam follower 122 engages a full diameter portion of the caster cam 112, and the roller tray cam follower 114 engages a flat portion of the roller tray cam 110. The flat portions of the roller tray cams 110 and the caster tray cams 112 lower the rollers 32 and caster wheels 42, respectively, about ½ inch when in their lower positions.

It will be noted that the cam followers 114 and 122 (FIGS. 4A and 6) are directly above the axis of their associated cam shafts 66,68. Thus, the handles 92 and 104 (FIG. 2) will balance each other and will remain in their set positions when released, thus requiring no latching device or the like.

As best shown in FIG. 6, a roller tray locking mechanism 129 includes a pair of threaded sleeves 130,132 welded to each cam assembly 64 and have cap screws 134,136 screwed therein. In response to moving the handles 92 and 104 to their lowest positions, each capscrew 134 is wedged against a sloping plate 138 secured to the associated frame member 46 and reinforced by a gusset 140. At the same time, each cap screw 136 is wedged against the lower surface of the associated leg 116 as shown in FIG. 5. Thus, when the trailer is loaded and is being pulled to a different location, this cap screw wedging action permits the weight of a container to be transferred from the feet 116 through the capscrews 134,136 directly to the chassis or main frame 22 of the trailer thus relieving the forces acting on the cam shaft bearings 70. Shims may be provided between the cap screws and the threaded sleeves to provide the desired spacing between the cap screws 134,136.

In order to prevent the container from rolling off the sides of the trailer 20 (FIG. 2) when supported by the rollers 32, a pair of container stops 150 and 152 are mounted on the main frame or chassis 22. Having reference to FIG. 7, each container stop 150,152 is supported within a generally rectangular housing 154 having a closed bottom wall 156 with a hole 158 therein. The housing is welded to the adjacent side wall 50 and to the associated box beams 48. A stop actuating rod 160 extends through the associated hole 158 and has its upper end welded to a bar 162 within the associated stop 150,152. Each stop includes a reinforced vertical inner wall 164 and an outwardly and downwardly inclined outer wall 166. A compression spring 168 is fitted around the rod 160 and is disposed between the bottom wall 156 of the housing and the bar 162 to urge the associated stop 150,152 upwardly as indicated in FIG. 7. A roll pin 170 or the like extends through the rod 160 and engages the bottom wall 156 of the housing to limit the spring urged upward movement of the container stops 150,152.

A first linkage 174 is provided to lower the container stops 150,152 below the roll plane RP in response to raising the caster tray 34, and includes a right hand portion connected to the right stop 152 and an identical left hand portion connected to the left stop 150. Since the right and left hand portions are identical, the same numerals will be used to describe the right and left hand sides, and equivalent portions of the left hand portion will be assigned the same numerals followed by a prime (').

Each first linkage portion comprises a chain link 176 pivotally connecting the rod 160 to an elongated arm 178 that has its other end welded to an elongated sleeve 180. The elongated sleeve is journaled on a rod 182 (FIGS. 7 and 8) which is supported by a pair of brackets 184 welded to the main frame 22. The rod 182 is held from axial movement by pins 186. A short arm 188 is welded to the sleeve 180 and is pivotally connected to a chain link 190 that is connected to a slot 192 in a bracket 194 welded to the caster tray 34. A wide, bent lever 196 is welded to the elongated sleeve 180 and has a slot 198 in its upper end which receives a bolt 200 that is welded to a narrow lever 202 of a second or manually operated linkage 204.

It will be apparent that movement of the caster tray upwardly from the position illustrated in FIG. 7 to the position illustrated in FIG. 9 will raise each chain link 190 and thus, through pair of lever arms 178,188, will pull both container stops 150,152 down below the roll plane RP.

It is also apparent that a container can be moved onto the trailer from either side after first engaging the sloping surface 166 of the adjacent stop 150 or 152 thereby camming the contacted stop downwardly allowing the container to be moved onto the rollers 32 when tangent to the roll plane RP for sole support on the rollers 32. It will be noted that the opposite stop remains up during this time. It will also be noted that the slot 192 in the caster wheel tray 34 permits the stop to be moved downwardly.

The second or manually operated container stop linkage 204 includes identical right hand and left hand portions. Accordingly, the same numerals will be used to describe the right and left hand portions, and the left hand portion will be identified with a prime (').

A right hand lever 210 and the previously mentioned narrow lever 202 are welded to a short sleeve 212 (FIG. 8) which pivots independently of the sleeve 180. A connecting rod 214 pivotally connects the right lever 202 to the left lever 202'. When the operator pulls the right hand lever 210 up, the narrow lever 202 pivots counterclockwise (FIG. 7) moving the bolt 200 within the slot 202 in the wide lever 196 without pivoting the wide lever 196 and accordingly the right spring 168 maintains the right stop 152 in its raised position. When the narrow lever 202 pivots, the connecting rod 214 pivots the narrow lever 202' counterconnecting clockwise, and the bolt 200' engages the end of the slot 198' thereby pivoting the wide lever 196' counterclockwise. This counterclockwise movement of the wide lever 196' pivots the lever 178' in a counterclockwise direction thus lowering the left stop permitting the operator on the right side to push the container off the left side of the trailer 20.

The roller tray 26 and caster tray 34 are guided for vertical movement by a pair of slideways 220 (FIGS. 2 and 5) at each end of the trays. Each slideway 220 includes a pair of spaced guide members 222 (FIG. 5) secured to the roller tray 26, and a single guide member 224 secured to the caster tray 34. Each side of the roller tray 28 is guided for vertical movement relative to the main frame 22 by a pair of angle bars 226 (FIG. 2) and a flat plate 228 secured to the roller tray 28 in position to be guided by the adjacent container stop housing 154.

A rear guide rail 230 and a substantially identical front guide rail 230' (FIG. 2) are provided in order to guide a container onto or off of the trailer 20 when the rollers 32 are tangent to the roll plane RP. Since the guide rails are substantially identical, only the rear rail 230 and its mounting linkages will be described in detail, and equivalent parts of the front rail will be assigned the same numerals followed by a prime (').

Figure 10:
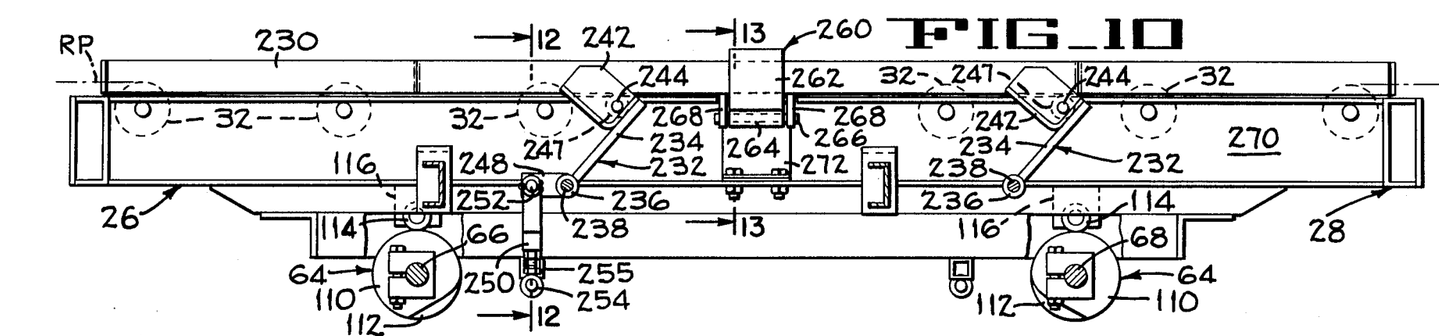
FIG. 10 is a section taken along lines 10—10 of FIG. 3 illustrating a rear transversely extending container guide rail in its raised position above the roll plane, the caster wheels being omitted for simplicity.

As illustrated in FIG. 10, the guide rail 230 extends above the roll plane RP while in FIG. 11 the guide rail is disposed below the roll plane RP in response to the roller tray 26 being lowered and the caster tray 36 being raised to a position wherein only the caster wheels 42 are tangent to the roll plane RP.

Figures 11, 12, 13:
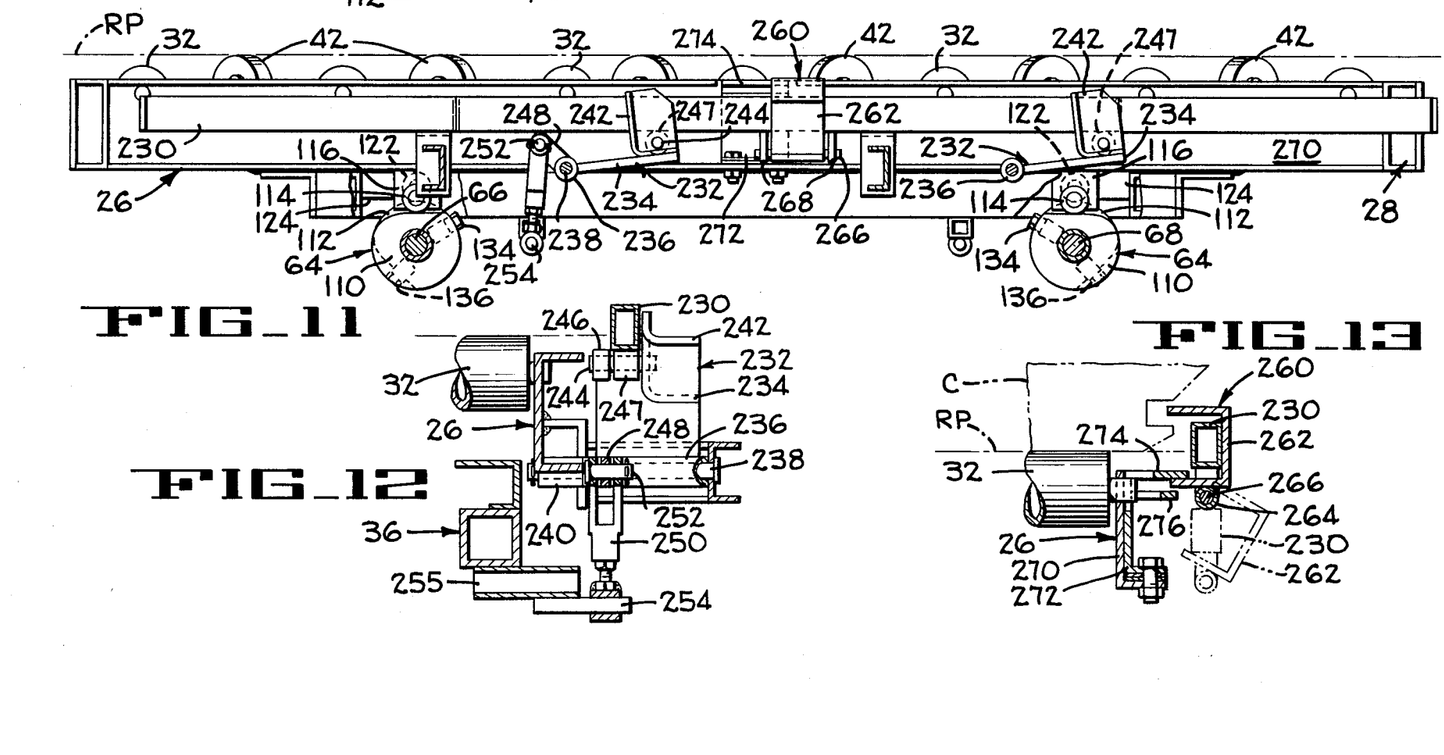
FIG 11 is a section similar to FIG. 10 but illustrating the guide rail below the roll plane in response to the caster wheel being tangent to the roll plane.
FIG. 12 is an enlarged section taken along lines 12—12 of FIG. 10.
FIG. 13 is a section taken along lines 13—13 of FIG. 10 illustrating a container clamp in two operative positions

Having reference to FIGS. 10–12, a pair of linkages 232 each include wide pivot plates 234 welded to a sleeve 236 that is mounted for rotation by pin 238 that is journaled in another sleeve 240 (FIG. 12) that is welded to the roller tray 26. The upper end portion of each wide pivot plate 234 has a fabricated angle member 242 welded thereto and slidably engaged with the guide rail 230. A pivot pin 244 is secured in a sleeve 246 welded to the wide pivot plate 234 and is journaled in a sleeve 247 welded to the guide rail 230 and also journaled in a hole in the angle member 242. A short lever arm 248 is welded to the sleeve 236 of one of the linkages 232 and is pivotally attached to a yoke 250 by a pivot pin 252. The yoke 250 is pivotally connected to a rod 254 that is welded to a square tube 255 that is, in turn, welded to the caster tray 36. Thus, movement of the caster tray 36 upwardly and the roller tray 26 downwardly so that only the casters 42 are tangent to the roll plane RP will lower the guide rails 230 and 230' below the level of the roll plane RP as illustrated in FIG. 11. Conversely, movement of the caster tray down and the roller tray up so that only the rollers 32 are tangent to the roll plane RP will raise the guide rails 230 and 230' into container guiding position as illustrated in FIG. 10.

As illustrated in FIG. 2, container clamps 260,260' are pivotally connected to the associated guide rails 230,230'. Each container clamp comprises a channel shaped clamp member 262 (FIGS. 10 and 13) welded to a sleeve 264 that is journaled by a pin 266 in a pair of ears 268 welded to the guide bar 230. A portion of the channel end wall 270 of roller tray frame 28 has its upper flange removed to receive a clamp member shifting bracket 272 which is bolted and shimmed to the channel wall 270. The clamp shifting bracket 272 includes an upper arm 274 and lower arm 276 which cooperate to pivot the channel shaped clamp member 262 between the solid line container clamping position and the dotted line release position illustrated in FIG. 13 in response to lowering the guide rail 230 to its lowermost position. As illustrated in FIG. 13, the guide rail 230 engages the lower leg of the clamp member 262 to limit the amount of clockwise pivotal movement of the clamp member 262.

The illustrated containers C (FIG. 1) when fully loaded weigh about 3500 pounds; are about 79 inches long at the top and 62 inches long at the base; are about 64 inches tall and about 60 ½ inches wide. It will be understood, of course, that other types of containers, such as loaded pallets, can be carried by the trailers 20 and can be oriented with their longitudinal axes transverse of or parallel to the longitudinal axis of the trailer for movement onto the loader in that attitude.

SECOND EMBODIMENT

In many respects, the second embodiment of the container trailer 20a of the present invention is the same or similar to that of the first embodiment. Accordingly, only the parts of the second embodiment that are different from those of the first embodiment will be described in detail. Parts of the second embodiment that are equivalent to those of the first embodiment will be assigned the same numerals followed by the letter "a".

Figure 14:
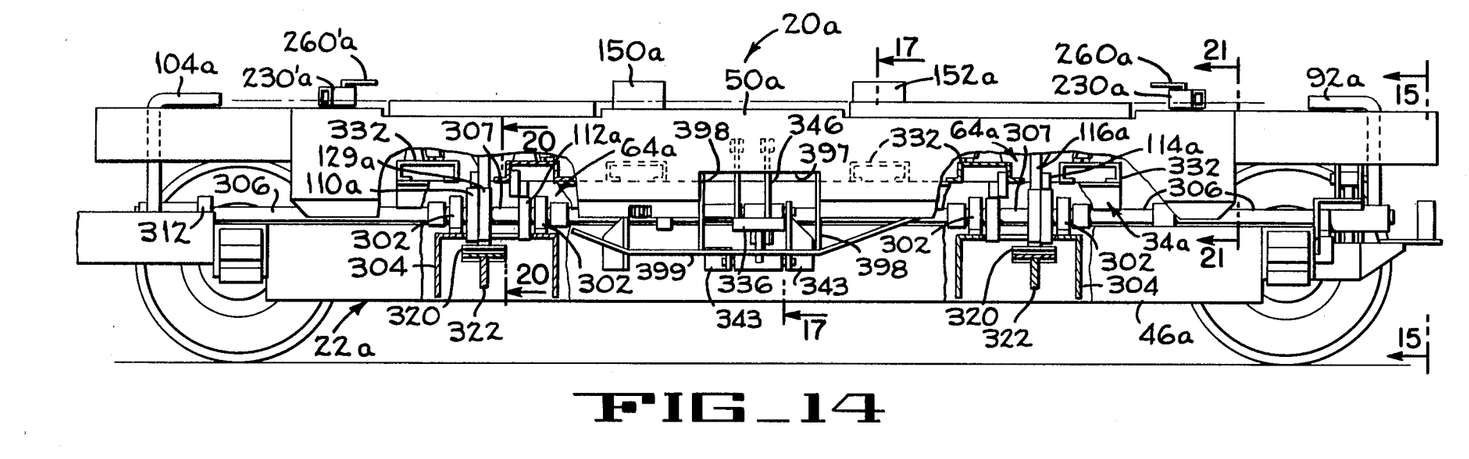
FIG. 14 is a side elevation of a second embodiment of the invention with parts cut away to illustrate differences in the cam arrangement, and a new caster tray configuration.
Figure 15:
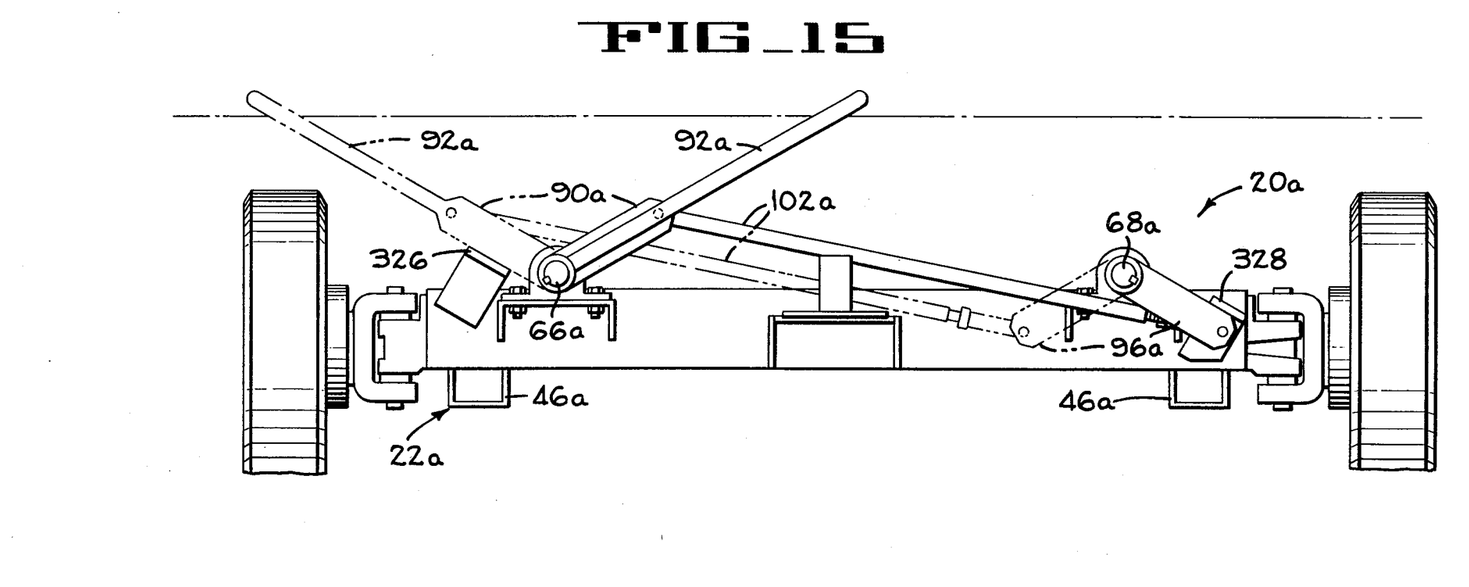
FIG. 15 is a section taken along lines 15—15 of FIG. 14 illustrating one of the handles in two operative positions spaced 120° apart for operating the cam shafts.
Figure 16:
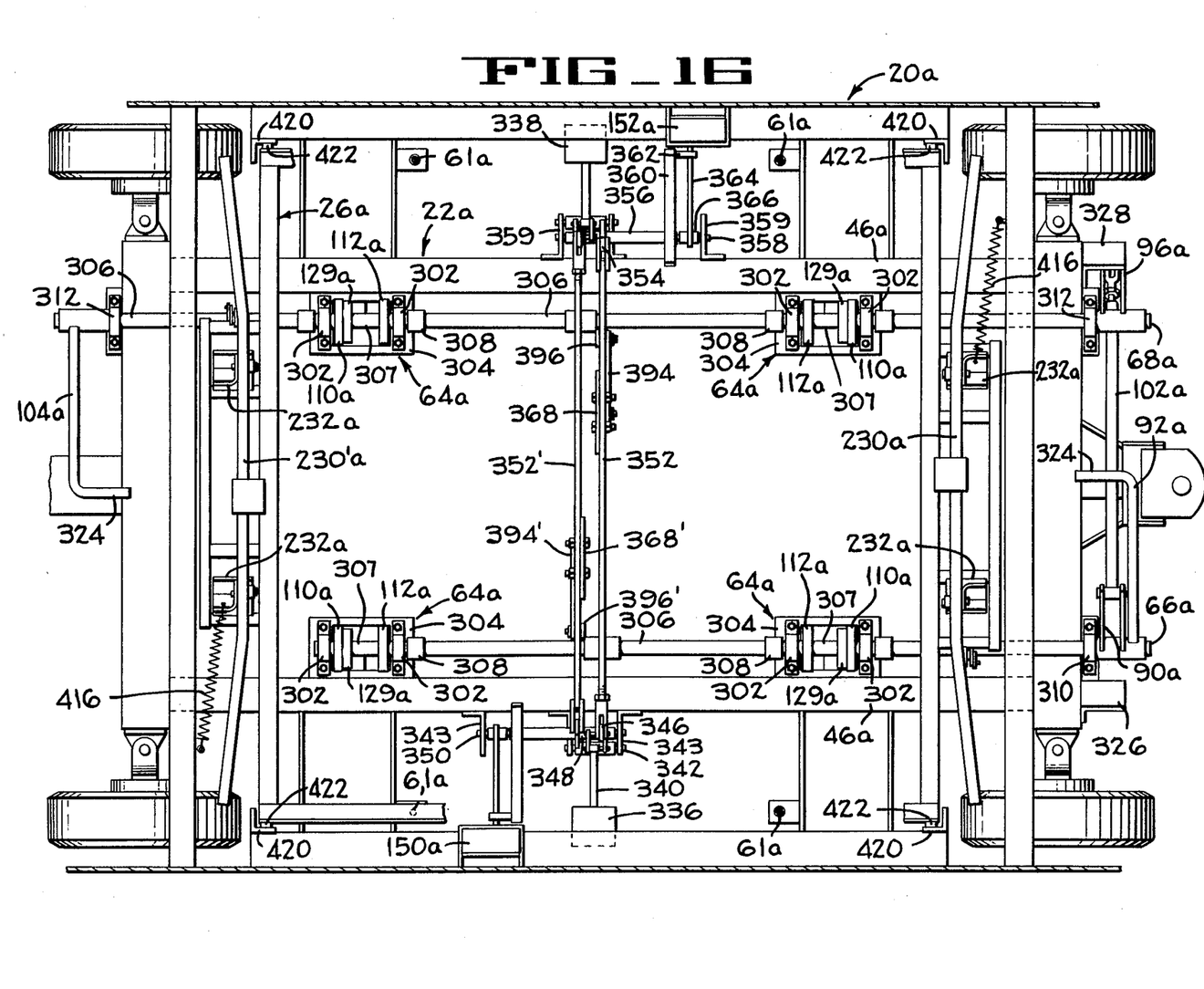
FIG. 16 is a plan of the trailer of FIG. 14 with the caster tray removed and only a portion of the roller tray frame being illustrated.

As shown in FIGS. 14–16, each of the four cam assemblies 64a are formed as weldments journaled in a pair of pillow block bearings 302 bolted to a channel bracket 304 welded to the box beams 46a of the main frame or chassis 22a of the trailer. Each cam assembly 64a includes a short cam shaft 306 that forms a portion of the associated left and right cam shafts 66a or 68a. As best shown in FIG. 16, the cam shaft 66a includes two stub cam shafts 307 connected by couplings 308 with an additional pillow block bearing 310 journaled on the rear end portion thereof. The cam shaft 68a (FIG. 16) likewise includes the associated stub shafts 307 connected to three shaft sections by couplings 308 with the end shaft sections journaled in bearings 312.

Each cam assembly 64a includes a roller tray cam 110a, caster tray cam 12a and a roller tray locking mechanism 129a, all of which are rigidly secured to the associated stub shaft 307. The configuration of the cams 110a and 112a are the same as that in the first embodiment of the invention but operate when moved through a shorter arc of about 120°. The locking mechanism 129a (FIG. 20) of the second embodiment comprises a disc 314 which includes lobes 316 and 318 which engage the associated leg 116a (which supports the roller tray cam follower 114a and the arcuate surface of a metal T-shaped guide 320 (FIGS. 14 and 20) in response to the cam shafts 66a and 68a being rotated to the position shown in FIG. 20 at which time the roller tray 110a is in its fully raised position. The T-shaped guide 320 is connected to a T-shaped bracket 322 which is welded to the frame member 46a. The T-shaped guide 320 is connected to the T-shaped bracket 322 having a pair of resilient pads 326 disposed therebetween and bolted as an assembly by a pair of bolts 324. The pair of resilient pads 326 may be formed of non-slip plastic, rubber or like material and functions to cushion the load carried on the roller tray 26a when the trailer 20a is moved from place to place. The locking mechanism 129a also transfers the weight of the load directly to the frame thus extending the life of the roller tray cam followers 114a.

The cam shafts 66a and 68a (FIG. 15) are manually pivoted about 120° by handle 92a (FIG. 16) or by handle 104a located on the rear and front of the trailer 20a, respectively. Each handle is provided with a longitudinally extending end portion 324 for easily grasping by the operator. The connecting rod 102a (FIG. 15) and lever arms 90a,96a operate similarly to those of the first embodiment except that lever stops 326 and 328 are provided to limit the stroke of the handles 92a and 104a between the solid line position, at which time the rollers 32a (FIG. 17) are tangent to the roll plane RPa, and the phantom line position at which time the caster wheels 42a (FIG. 18) are tangent to the roll plane RPa.

The caster tray 34a (FIG. 14) of the second embodiment of the invention differs from that disclosed in FIG. 3 of the first embodiment in that relatively narrow spaced channels 332 (FIG. 14) extend transversely of the trailer and are provided to support the caster wheels 42a. The use of the spaced channels 332 minimizes accumulation of snow or the like on the trailer 20a.

The second embodiment of the container trailer 20a also includes container stops 150a and 152a (FIG. 16-19) which are manually operated by foot pedals 336,338 rather than by hand operated levers as in the first embodiment of the invention. Depression of one of the pedals, for example, pedal 336 (FIG. 17) lowers the stop 152a on the opposite side of the trailer 20a while leaving the stop adjacent the depressed pedal in raised container stopping position. Also, pivoting the cam shafts 66a,68a (FIG. 18) to a position wherein the caster wheels 42a are tangent to the roll plane RPa is effective to lower both stops 150a,152a.

Figure 17:
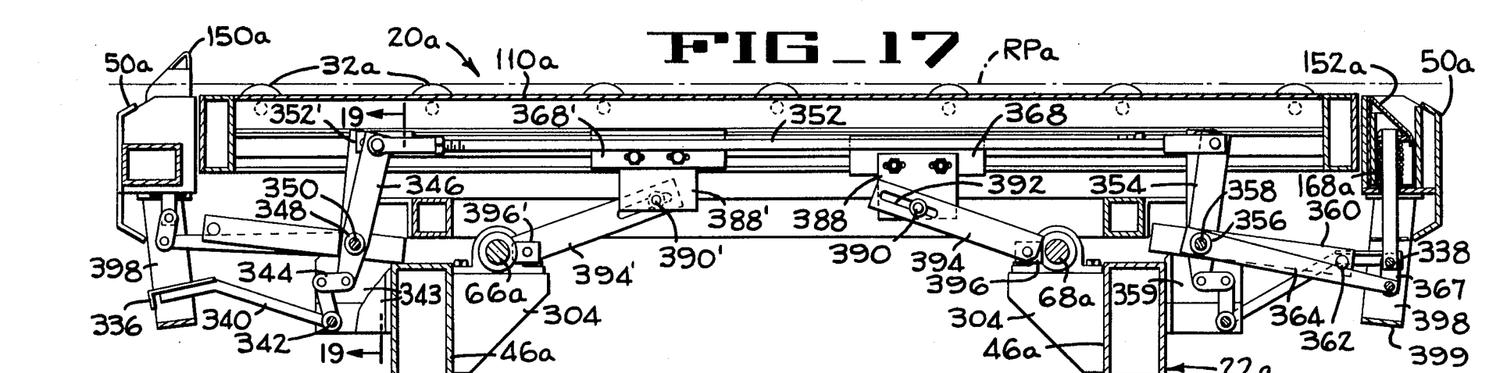
FIG. 17 is a section taken along lines 17—17 of FIG. 14 illustrating a foot operated container stop mechanism, the rolls of the roller tray being tangent to the roll plane and the left pedal being depressed thereby lowering the right stop.
Figures 18, 19, 20:
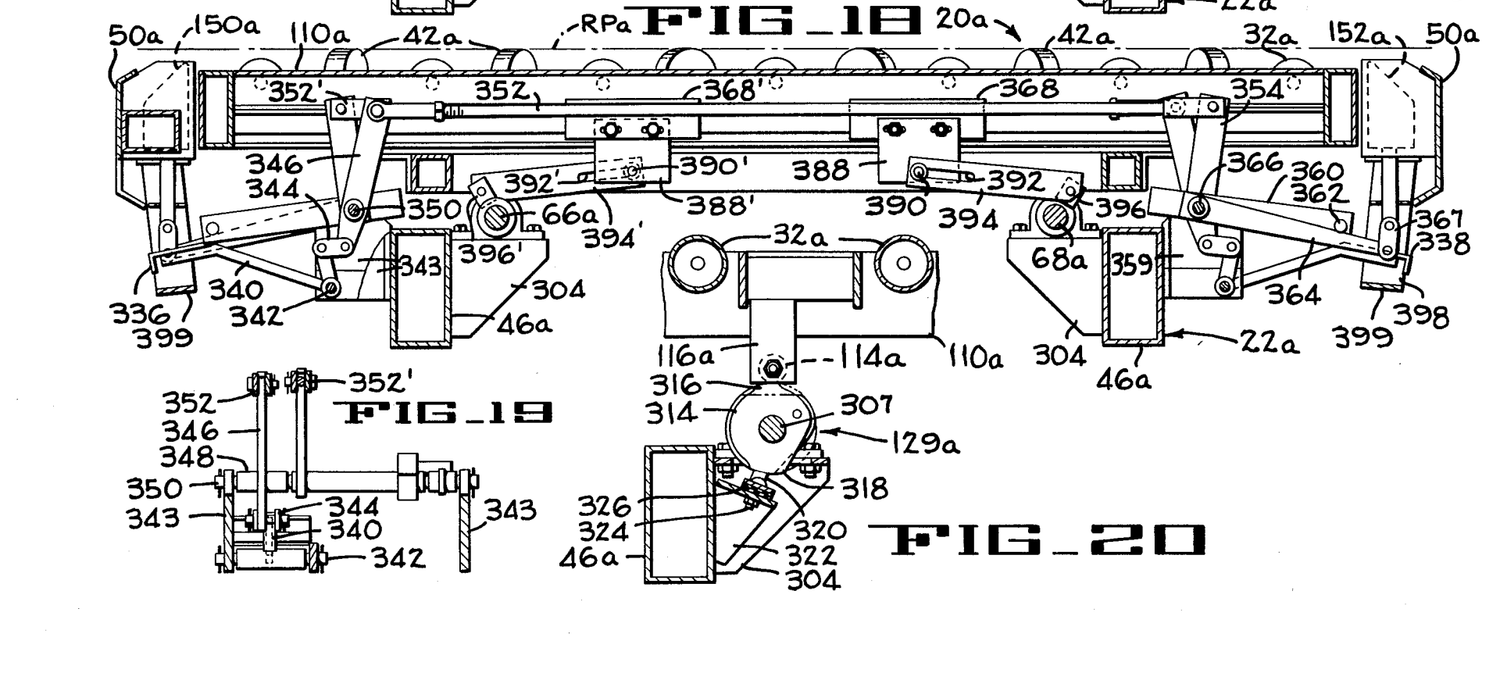
FIG. 18 is similar to FIG. 17 but with the cam shaft being rotated 120° which lowers both stops and the roller tray and raises the casters into position tangent with the role plane.
FIG. 19 is a section taken along lines 19—19 of FIG. 17.
FIG. 20 is a section taken along lines 20—20 of FIG. 14 illustrating the position of one of the cams when holding the rollers tangent to the roll plane.
Figure 21:
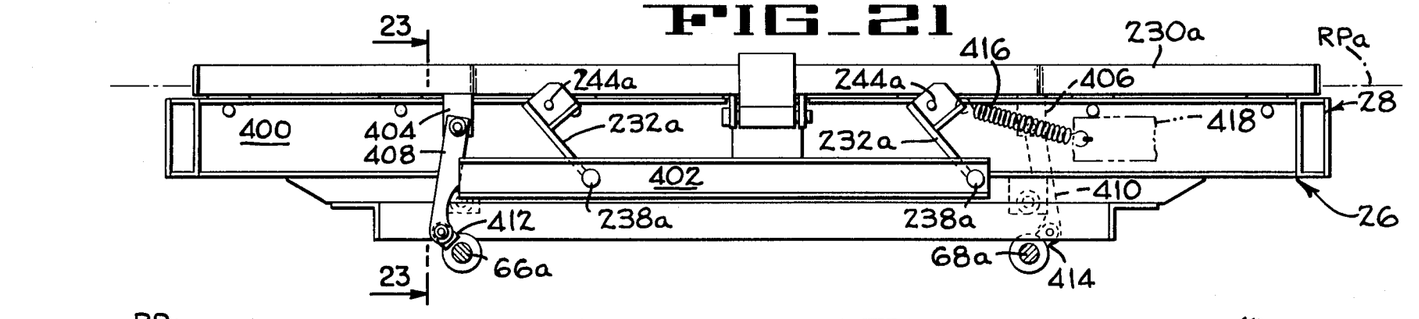
FIG. 21 is a section taken along lines 21—21 of FIG. 14 illustrating one of the guide rails in an elevated position.

Depressing pedal 336 as indicated in FIG. 17 pivots the pedal and its bell crank lever arm 340 about the axis of a pivot pin 342 that is secured to the beam 46a of the main frame 22a by brackets 343 as shown in FIGS. 16, 17 and 19. A connecting link 344 is pivotally connected to the bell crank lever arm 340 and to the lower end of a lever 346 that is secured to a short sleeve 348 journaled on a long pin 350 secured to the box beam 46a of the frame 22a by the brackets 343. A long transversely extending connecting rod 352 is pivotally connected to the upper end of the lever 346 and to the upper end of a lever 354 on the right side of the trailer 20a which is secured to a long tube 356. The long tube 356 is journaled on a pin 358 in brackets 359 secured to the right frame member 46a. A stop actuating arm 360 (FIGS. 16 and 17) is welded to the long tube 356 and has a pin 362 welded to its outer end and projecting over a stop actuating lever 364 that is welded to a short tube 366 journaled on the pin 358. The outer end of the lever 364 is pivotally connected to the stop 152a by a link 367. Thus, depression of the pedal 366 will pull the stop 152a downwardly against the urging of the spring 168a.

It will be noted that the movement of the connecting rod 352 to the right (FIG. 17) in response to depressing the pedal 336 will also move a strap 368 welded to the rod 352 and an adjustable plate 388 connected to the strap 368 by bolts extending through slots. A shouldered bolt 390 or the like extends through a long slot 392 and an arm 394 thus permitting movement of the rod 352 without movement of the arm 394 as clearly shown in FIG. 17. The arm 394 is pivoted to a crank arm 396 secured to the cam shaft 68a.

Since the left and right mechanisms for actuating the stops 150a and 152a are identical but reversed as clearly shown in FIG. 16, the mechanism which lowers the stop 150a upon depression of pedal 338 will not be described in detail. In the description to follow covering the automatic lowering of the stops 150a,152a in response to pivoting the cam shafts 120° which moves the rollers 32a down and the casters 42a into position tangent with the roll plane RPa, parts of the mechanism for lowering the stop 150a which require description will be assigned the same numerals followed by a prime.

As illustrated in FIG. 18, the cam shafts 66a and 68a have been pivoted 120° thereby raising the caster wheels 42a tangent to the roll plane RPa thus permitting the container supported thereon to be pivoted about a vertical axis. Pivoting the cam shaft 68a causes the shouldered bolt 390 to engage the left end of the slot thus shifting rod 352 to the right as illustrated, and also lowers the right stop 152a through previously described linkages. Similarly, crank arm 396' on cam shaft 66a moves slotted arm 394' to the left (FIG. 18) which moves the right end of the slot 392' against the shouldered bolt 390' thereby moving the strap 368', the adjustable plate 388', and the long connecting rod 352' (FIGS. 16 and 18) to the left thereby lowering the stop 150a as illustrated in FIG. 18.

In order to permit the foot of an operator to reach the pedals 336 and 338, the lower portions of the side guards 50a (FIGS. 14, 17 and 18) are cut away at 97 (FIG. 14). A pair of straps 398 are welded to and extend downwardly from the sides of the cut away portion 397. A pedal guard 399 is welded to the lower ends of the straps 398 on each side of the trailer 20a and to the chassis 22a for minimizing the chance of the pedals being damaged by contacting obstructions on the ground.

FIGS. 16, 21, 22 and 23 disclose a simple structure for lowering the guide rails 230a and 230'a (FIG. 16). Since the mechanism for lowering both guide rails are the same, only the mechanism associated with the rail 230a will be described in detail. However, the crank actuating means for the front rail 230'a will be described.

The guide rail 230a is pivotally connected to transversely extending channel member 400 and 402 of the roller tray frame 28 by linkages 232a and pivot pins 244a and 238a. Angle brackets 404 and 406 are welded to the rear guide rail 230a and front guide rail 230'a, respectively, and are pivotally connected to the crank arms 408,410. The other end of the crank arms 408,410 are pivotally connected to the rear (FIGS. 16 and 22) cranks 412,414, respectively, which are rigidly connected to cam shafts 66a and 68a, respectively. A spring 416 is connected between one of the linkages 232a and a transverse member 418 (FIG. 18) of the chassis 22a for normally urging the guide rail 230a upwardly.

Figures 22, 23:
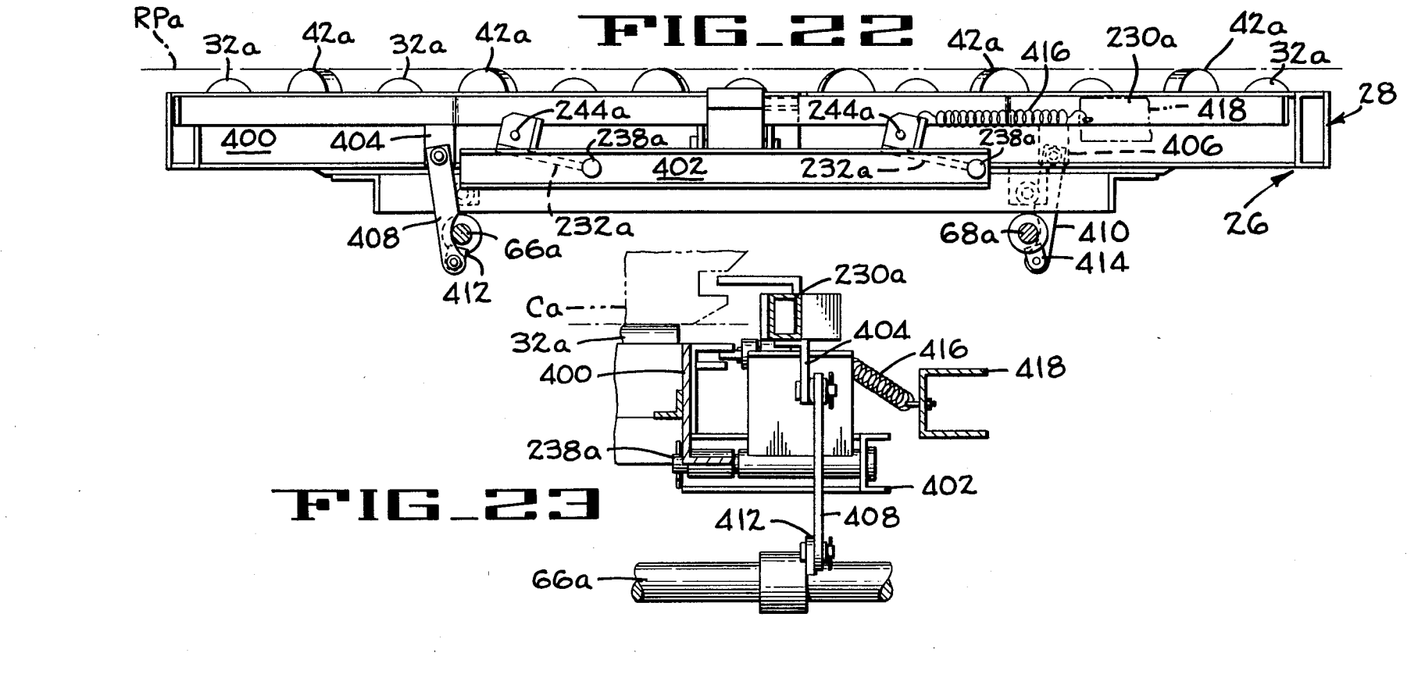
FIG. 22 is a section similar to FIG. 21 but illustrates the guide rail in a lowered inoperative position in response to rotating the cam shafts 120°.
FIG. 23 is a section taken along lines 23—23 of FIG. 21.

When the cam shafts 66a and 68a are rotated 120° to the position illustrated in FIG. 22, the caster wheels 42a are tangent to the roll plane RPa and the crank arms 408,410 pull the guide rails 230a,230'a downwardly below the roll plane RPa thereby permitting a container on the caster wheels 42a to be pivoted about a vertical axis near the midpoint of the trailer 20a.

It will be understood that the container clamps 260a,260'a (FIG. 14), which are substantially the same as the clamps of the first embodiment, swing outwardly and downwardly below the container Ca (FIG. 23) thereby releasing the container for rotation.

The location of the four roller tray hold down rods 61a is illustrated in FIG. 16 and are used in the second embodiment for allowing the tray 26a to move vertically only slightly in excess of ½ inch. In order to guide the roller tray for vertical movement, a vertically extending angle member 420 is rigidly secured to the chassis 22a immediately adjacent each corner of the roller tray 26a, and a bearing plate 422 is secured to each corner of the tray in sliding engagement with the angle brackets.

From the foregoing description it is apparent that the trailer of the present invention is a "no-lift" trailer since the container is supported on a roll plane which remains the same distance above the ground at all times. When a container is to be moved onto or off of the trailer, or the trailer and container are moved as a unit to a different location, the rollers are tangent to the roll plane and provide sole support for the container. When the container is to be rotated to a different position on the trailer, the fixed caster wheels are first raised into tangency with said roll plane so that the container is momentarily supported by the rollers and the wheels, and the rollers are then moved below the roll plane providing sole support of the container. Container stops and guide rails are moved below the roll plane in response to the wheels being moved into tangency with the roll plane, thereby permitting the container to be rotated about a vertical axis to any desired position on the trailer.

Although the best mode contemplated for carrying out the present invention has been herein shown and described, it will be apparent that modification and variation may be made without departing from what is regarded to be the subject matter of the invention.

What is claimed is:

1. An apparatus for supporting a container at a roll plane for selectively allowing movement of a container about an axis normal to said plane and along a path, comprising:
   means defining a plurality of rollers having container supporting surfaces movable into positions tangent to said roll plane for supporting the container for movement along said path;
   means defining a plurality of wheels having axes of rotation intersecting said normal axis and having container supporting surfaces movable into positions tangent to said roll plane; and
   elevation changing means for changing the elevation of said wheels to a height tangent to said roll plane for jointly supporting the container on said rollers and said wheels and for thereafter changing the elevation of said rollers to a position below said roll plane for supporting the container solely on said wheels at said roll plane for permitting rotation of the container about said normal axis, said roller means and said wheel means being limited to movement by said elevation changing means between a position wherein their container supporting surfaces are tangent to said roll plane and a position below said roll plane.

2. An apparatus according to claim 1 and additionally comprising a non-slip tread on the peripheries of at least some of said wheels for preventing the container from slipping when being rotated about said normal axis.

3. An apparatus according to claim 1 wherein said path is a linear path.

4. An apparatus according to claim 1 wherein the container is moved onto or off the rollers when supported solely by the rollers when tangent to said roll plane.

5. An apparatus according to claim 1 and additionally comprising a mobile frame for supporting said rollers and wheels and for bodily moving the container between different locations while supported on said rollers.

6. An apparatus according to claim 1 and additionally comprising container stop means positioned adjacent opposite ends of said path for movement between a position above or below said plane, and means for lowering said stops below said roll plane in response to raising said wheels into a position tangent to said roll plane.

7. An apparatus according to claim 6 and additionally comprising linkage means for manually lowering one of said stops below said roll plane adjacent one end of said path from a position adjacent the other end of said path when the container is supported solely by said rollers for permitting movement of the container off said rollers over said one stop to a location spaced from said rollers.

8. A container transfer apparatus comprising:
   means defining a main frame;
   means including a roller tray supported by said frame for vertical movement, a plurality of parallel rollers journaled on said roller tray and having upper container supporting surfaces movable between a position tangent to a roll plane and a lower position, said roll plane remaining at a constant elevation;
   means including a caster tray supported by said frame for vertical movement, a plurality of wheels journaled on said caster tray and having their axes of rotation intersecting an axis normal to said roll plane about which the container may be rotated, said wheels having upper container supporting surfaces movable between a position tangent to said roll plane and a lower position spaced from said roll plane; and tray moving means for moving said trays vertically between positions in which only said rollers are tangent to said roll plane, in which both said rollers and said wheels are tangent to said roll plane, and in which only said wheels are tangent to said roll plane, said rollers and said wheels being limited to movement by said tray moving means for moving said trays vertically between first positions wherein said container supporting surfaces are tangent to said roll plane and second positions wherein said container supporting surfaces are spaced below said roll plane.

9. An apparatus according to claim 8 wherein said main frame is supported on the chassis of a movable vehicle.

10. A container transfer apparatus comprising:
means defining a main frame;
means including a roller tray supported by said frame for vertical movement, a plurality of parallel rollers journaled on said roller tray and having upper surfaces movable between a position tangent to a roll plane and a lower position, said roll plane remaining at a constant elevation;
means including a caster tray supported by said frame for vertical movement, a plurality of wheels journaled on said caster tray and having their axes of rotation intersecting an axis normal to said roll plane about which the container may be rotated, said wheels having upper surfaces movable between a position tangent to said roll plane and a lower position spaced from said roll plane; and
means for moving said tray vertically between positions in which only said rollers are tangent to said roll plane, in which both said rollers and said wheels are tangent to said roll plane, and in which only said wheels are tangent to said roll plane;
a container being moved onto said transfer system with its lower surface supported by said rollers at said roll plane; said moving means being actuated to move said wheels tangent to said roll plane in supporting engagement with the container, and thereafter to lower said rollers out of said roll plane with the containers supported solely by said wheels permitting the container to be rotated about said normal axis.

11. A container transfer system according to claim 8 and additionally comprising resilient means on the periphery of said wheels for controlling rotation of a container about said normal axis when supported only by said wheels.

12. A container transfer apparatus comprising:
means defining a main frame;
means including a roller tray supported by said frame for vertical movement, a plurality of parallel rollers journaled on said roller tray and having upper surfaces movable between a position tangent to a roll plane and a lower portion, said roll plane remaining at a constant elevation;
means including a caster tray supported by said frame for vertical movement, a plurality of wheels journaled on said caster tray and having their axes of rotation intersecting an axis normal to said roll plane about which the container may be rotated, said wheel having upper surfaces movable between a position tangent to said roll plane and a lower position spaced from said roll plane; and
means for moving said tray vertically between positions in which only said rollers are tangent to said roll plane, in which both said rollers and said wheels are tangent to said roll plane, and in which only said wheels are tangent to said roll plane;
said moving means comprising a plurality of pairs of caster tray cams and roller tray cams journaled on said frame; a plurality of caster tray cam followers mounted on said caster tray and engaging the peripheral surface of said caster tray cams; a plurality of roller tray cam followers mounted on said roller tray and engaging the peripheral surfaces of the roller tray cams; said peripheral surfaces of each pair of cams having arcuate portions which maintain the wheels and rollers tangent to said plane; and including surfaces which allow said caster tray and said roller tray to move downwardly below the roll plane upon rotating the cams to different operative positions; and means for rotating said cams between said different operative positions.

13. A container transfer system according to claim 12 and additionally comprising cam shafts journaled on said main frame, means for securing said pairs of cams to said cam shafts, linkage means interconnecting said cam shafts for equal movement in opposite directions, and manually operated means connecting to one of said shafts for rotating said cam shafts through an arc of between about 120° to 150°.

14. A container transfer apparatus comprising:
means defining a main frame;
means including a roller tray supported by said frame for vertical movement, a plurality of parallel rollers journaled on said roller tray and having upper surfaces movable between a position tangent to a roll plane and a lower position, said roll plane remaining at a constant elevation;
means including a caster tray supported by said frame for vertical movement, a plurality of wheels journaled on said caster tray and having their axes of rotation intersecting an axis normal to said roll plane about which the container may be rotated, said wheels having upper surfaces movable between a position tangent to said roll plane and a lower position spaced from said plane;
means for moving said tray vertically between positions in which only said rollers are tangent to said roll plane, in which both said rollers and said wheels are tangent to said roll plane, and in which only said wheels are tangent to said roll plane;
movable container stop means on each side of said main frame, resilient means urging said stop means upwardly above said roll plane, and first linkage means interconnecting said stop means to said means for moving said trays and responsive to movement of said caster tray upwardly for moving said stop means downwardly below said roll plane.

15. A container transfer system according to claim 12 and additionally comprising movable container stop means on each side of said main frame, resilient means urging said stop means upwardly above said roll plane, and linkage means interconnecting said stop means to said means for moving said trays and responsive to movement of said caster tray upwardly for moving said stop means downwardly below said roll plane.

16. An apparatus according to claim 14 and additionally comprising manually operated linkage means connected to said first linkage means and responsive to manual actuation of said manual linkage means on one side of said main frame for lowering said container stop means on the other side of said main frame below said roll plane when said rollers are tangent to said roll plane and when said caster wheels are below said roll plane.

17. An apparatus according to claim 12 and additionally comprising first and second abutment means secured to each of said pairs of cams and rotatable therewith, mounting plates secured to said main frame in positions to be engaged by said first abutment means, and means defining surfaces on said roller tray in position to engage said second abutment means, rotation of said pairs of cams into positions which move said rollers tangent to said roll plane and lowers said wheels below said plane being effective to wedge said first abutment means against said plates and said second abutment means against said roller tray surfaces for minimizing forces acting on the cams.

18. A container transfer apparatus comprising:
    means defining a main frame;
    means including a roller tray supported by said frame for vertical movement, a plurality of parallel rollers journaled on said roller tray and having upper surfaces movable between a position tangent to a roll plane and a lower position, said roll plane remaining at a constant elevation;
    means including a caster tray supported by said frame for vertical movement, a plurality of wheels journaled on said caster tray and having their axes of rotation intersecting an axis normal to said roll plane about which the container may be rotated, said wheels having upper surfaces movable between a position tangent to said roll plane and a lower position spaced from said plane;
    means for moving said trays vertically between positions in which only said rollers are tangent to said roll plane, in which both said rollers and said wheels are tangent to said roll plane, and in which only said wheels are tangent to said roll plane; and
    front and rear guide rails; linkage means pivotally connecting each guide rail to said roller tray; crank means pivotally connecting said linkage means to said means for moving said trays for pivoting said guide rails below said roll plane in response to the wheels moving upwardly tangent to said roll plane and the rollers moving below said roll plane, and for moving at least a portion of said guide rails above said plane in response to movement of, said rollers tangent to said roll plane and said wheels below said roll plane.

19. An apparatus according to claim 18 and additionally comprising a container latch pivotally supported on each of said guide rails, and trip means connected to said roller tray for pivoting each of said latches into latching engagement with said container in response to movement of said rollers into positions tangent with said roll plane and for unlatching each latch from the container in response to said guide rails moving below said roll plane.

20. A container transfer system according to claim 13 wherein said manually operated means is a hand operated lever.

21. An apparatus according to claim 14 wherein said means for moving the trays vertically are cam means, and wherein said first linkage means operatively interconnects said stop means to said cam means.

22. An apparatus according to claim 13 wherein said manually operated means preferably rotates said shafts through an arc of about 120°.

23. An apparatus according to claim 12 and additionally comprising a disc rigidly secured to and rotatable with each of said pairs of cams and having first and second lobes thereon, mounting plates secured to said main frame, lobe contacting means mounted on each of said mounting plates in position to be contacted by said first lobes, resilient means disposed between each of said mounting plates and said lobe contacting means, and means defining surfaces on said roller trays in position to engage said second abutment means, rotation of said pairs of cams into positions which move said rollers tangent to said roll plane being effective to wedge said first abutment means against said load contacting means and said second abutment means against said roller tray surfaces for minimizing detrimental forces acting on said cams.

24. An apparatus according to claim 8 and additionally comprising hold-down means connected between said roller tray and said main frame for limiting the upward vertical movement of said roller tray to a position wherein the rollers are tangent or slightly above said roll plane.

25. A method of selectively moving a container about an axis normal to a roll plane when supported at the roll plane by a plurality of rotatable wheels having their axes intersecting said normal axis and along a path when supported at the roll plane by parallel rollers comprising the steps of:
    Moving only container supporting surfaces of the rollers into position tangent to said roll plane for supporting the container at said roll plane;
    raising container supporting surfaces of said wheels into a position tangent to said roll plane for jointly supporting the container on the container supporting surfaces of said rollers and said wheels; and
    lowering said rollers below said roll plane for solely supporting said container on said container supporting surfaces of said wheels when tangent to said roll plane for permitting rotation of the containers about said axis, said rollers and wheels being limited to movement between first positions wherein said container supporting surfaces are tangent to said roll plane and to a second position wherein said container supporting surfaces are spaced below said roll plane.

26. A method according to claim 25 wherein said path is a linear path.

27. A method according to claim 25 wherein the container is moved onto and off the rollers when supported solely by the rollers when tangent to said roll plane.

28. A method according to claim 25 and additionally comprising the step of bodily moving the container and rollers while supported on said rollers to a different location.

29. A method of selectively moving a container about an axis normal to a roll plane when supported at the roll plane by a plurality of rotatable wheels having their axes intersecting said normal axis and along a path when supported at the roll plane by parallel rollers, and container stops positioned adjacent opposite ends of the path of movement between a position above or below said plane, said method comprising the steps of:
    moving only the rollers into a position tangent to said roll plane for supporting the container at said roll plane;
    raising said wheels into a position tangent to said roll plane for jointly supporting the container on said rollers and said wheels;

lowering said rollers below said roll plane for solely supporting said containers on said wheels when tangent to said roll plane and for permitting rotation of the containers about said axis; and lowering the stops below said roll plane in response to raising the wheels into a position tangent to said roll plane.

30. A method according to claim 29 and additionally comprising the step of manually lowering one of said stops below the roll plane adjacent one end of said path from a position adjacent the other end of said path when the container is supported solely by said rollers to permit movement of the container off said rollers over said one stop to a location spaced from said rollers.

31. An apparatus for supporting a flat bottomed article at a roll plane and for selectively allowing movement of the article about an axis normal to said roll plane and along a path parallel to said roll plane, comprising:

a plurality of first rotatable means each having circular surfaces generated about an axis of rotation and adapted to have upper portions of said circular surfaces moving into article supporting position tangent to said roll plane;

a plurality of second rotatable means each having circular surfaces generated about an axis of rotation that intersects said normal axis, said second rotatable means having upper portions of said circular surfaces movable into article supporting position tangent to said roll plane; and elevation changing means operatively connected to said first rotatable means and to said second rotatable means, said elevation changing means being effective to maintain said roll plane and the article supported thereon at the same elevation while selectively lowering said first rotatably means when said article is to be rotated about said normal axis and lowering said second rotatable means below said roll plane after first raising said first rotatable means to a position tangent to said roll plane for eliminating the need to lift the article.

32. An apparatus for supporting a flat bottomed article at a roll plane and for selectively allowing movement of the article about an axis normal to said roll plane and along a path parallel to said roll plane, comprising:

a plurality of first rotatable means each having circular surfaces generated about an axis of rotation and adapted to have upper portions of said circular surfaces moved into article supporting position tangent to said roll plane;

a plurality of second rotatable means each having circular surfaces generated about an axis of rotation that intersects said normal axis, said second rotatable means having upper portions of said circular surfaces movable into article supporting position tangent to said roll plane, and elevation changing means operatively connected to said first rotatable means and said second rotatable means for maintaining the flat bottom of the article in the roll plane at the same height when moving the article along said path after first lowering said second rotatable means below said path, and for maintaining the flat bottom of the article in the roll plane at the same height when rotating the article about said normal axis after first lowering said first rotatable means below said roll plane.

* * * * *